United States Patent
Schumacher et al.

[15] 3,656,661
[45] Apr. 18, 1972

[54] DOSAGE DEVICE FOR PNEUMATICALLY OPERATING DISTRIBUTION SYSTEMS

[72] Inventors: Ferdinand Schumacher, Coesterweg 42, 477 Soest; Heinrich Weiste; Helmut Weiste, both of 4771 Sieningsen near Soest, all of Germany

[22] Filed: July 23, 1970

[21] Appl. No.: 57,463

[30] Foreign Application Priority Data

Sept. 12, 1969 Germany..................P 19 46 213.6

[52] U.S. Cl............................................222/194, 222/349
[51] Int. Cl.....................................B65g 53/46, B67d 5/54
[58] Field of Search..............302/49, 51, 57; 222/194, 349

[56] References Cited

UNITED STATES PATENTS

| | | | |
|---|---|---|---|
| 2,099,315 | 11/1937 | Prochazka | 302/57 X |
| 1,096,785 | 5/1914 | Jensen | 302/49 |
| 1,319,348 | 10/1919 | Kinter | 302/49 |
| 2,717,076 | 9/1955 | Leighton et al. | 302/49 X |
| 2,011,133 | 8/1935 | Yoss | 302/49 X |
| 3,085,834 | 4/1963 | Woten et al. | 302/49 |
| 1,090,120 | 3/1914 | Scott | 302/49 |

FOREIGN PATENTS OR APPLICATIONS

| | | | |
|---|---|---|---|
| 410,033 | 5/1934 | Great Britain | 302/49 |
| 689,680 | 4/1953 | Great Britain | 302/57 |
| 180,310 | 6/1955 | Sweden | 222/194 |

Primary Examiner—Evon C. Blunk
Assistant Examiner—W. Scott Carson
Attorney—Merchant & Gould

[57] ABSTRACT

A measuring device for a pneumatically operated system for spreading granular material wherein the material is introduced into an intake funnel having a bottom outlet opening, with a compartmentalized dosage disk rotatably mounted therein, the disk having a discharge side leading to an air duct with an ejector unit mounted therein to form a low pressure area adjacent the discharge side. The discharge side of the disk is sealed by a simple, flexible lip seal and the reverse side is sealed by a wider gasket operating against the circumferential edges of the disk compartments. The ejection unit includes a trap nozzle for introducing air flow into the air duct, an extension piece spaced downstream therefrom, and a feeder opening between them for said granulated material being discharged from said disk.

1 Claims, 2 Drawing Figures

INVENTORS
FERDINAND SCHUMACHER
HEINRICH WEISTE
HELMUT WEISTE

BY Merchant & Gould

ATTORNEYS

DOSAGE DEVICE FOR PNEUMATICALLY OPERATING DISTRIBUTION SYSTEMS

BACKGROUND OF THE INVENTION

1. Field of the Invention

The invention refers to a dosage device for pneumatically operating spreading systems in mechanisms for spreading granular material such as seed grain or fertilizer by means of: an intake funnel connected with a supply bin; a compartmentalized dosage disk located inside and at the bottom of the intake funnel; and an air supply connected to the discharge side of the compartmentalized dosage disk and opening into the transport duct for the measured granular material, through which duct the material is brought to the actual spreader. In this device, the compartmentalized dosage disk inside the outlet of the intake funnel is sealed by means of gaskets which operate on the circumference of the disk.

2. Description of the Prior Art

Dosage devices of various kinds are known in mechanisms for spreading granular material. One such known model can be characterized as follows: at the bottom of an intake funnel there is located a so-called compartmentalized dosage disk which may have diagonal cogs and which may be adjusted evenly and continuously for amounts ranging, for example, from 2 to 400 kg per hectare. Careful and exact dosage of the material to be spread is especially important in the case of seed grain, since optimal per-hectare yields at harvest time require precise dosage of the seed grain when it reaches the ground via the spreader.

In previously known dosage devices, after the material has been discharged from the compartmentalized dosage disk in measured amounts, it is expelled by means of an air current which is conveyed past the discharge side of the compartmentalized dosage disk through an air duct. In order to prevent the locally higher air pressure from blowing back through the compartmentalized dosage disk into the intake funnel and the supply bin, it has previously been customary to seal the compartmentalized dosage disk at two points on its circumference by means of protruding elastic gaskets. The gaskets are in contact with the compartmentalized dosage disk over an area of sufficient length to insure that the individual compartments are perfectly sealed.

While previously the gasket located on the reverse side of the dosage disk has operated satisfactorily, the gasket located on the discharge side necessarily presented considerable disadvantages. When granular seeding material, for example grain, etc., was expelled via the dosage disk, it was possible for the gasket, which exerted a certain pressure on the compartment walls, to cause damage to the grain. Such damage, in turn, led to uneven growth of the crop. If very fine seeding material, for example rape-mustard or the like, was being put out, the gasket pressing against the edges of the compartments caused crushing of the seed grain, whereupon the oil content of the grain resulted in a gumming of the entire compartmentalized dosage disk. As a consequence of the gumming, the necessary and desired precision of the compartmentalized dosage disk is considerably reduced.

SUMMARY OF THE INVENTION

The invention answers to the task of creating an expulsion and sealing mechanism for compartmentalized dosage disks, such that the disadvantages of earlier models are avoided and problem-free expulsion is achieved together with a perfect seal, independently of the material being expelled.

This objective of the invention is achieved by combining the following features:

a. an ejector/injector unit located in the area of the discharge side of the compartmentalized dosage disk and consisting of a trap-nozzle, an extension piece and a feeder opening for the granular material; and b. replacement of the gasket located on the discharge side of the compartmentalized dosage disk by a simple, flexible lip seal.

In contrast to previously known systems, this arrangement results in the discharge side of the compartmentalized dosage disk being an area of low pressure rather than an area of high pressure. Consequently, the granular material which is discharged in measured amounts from the individual compartments is drawn into the conveyor air duct. In an arrangement of this kind, the allocation of a lip seal is sufficient. This renders superfluous the gaskets which previously have been customarily mounted on the discharge side of the compartmentalized dosage disk where they covered a considerable area on the circumference of the disk. The new seal located in the area of the discharge side serves only to prevent the measured material from being drawn out of the individual compartments as a consequence of the low pressure in the area of the discharge side of the compartmentalized dosage disk.

It is further specified in the invention that the ejector unit shall be built into the air duct which is tangent to the compartmentalized dosage disk. Thus, relative to earlier models, the new arrangement requires no significant spatial changes. The extension piece of the ejector unit and the gasket is built into the air duct in such a way that it is easily replaceable. In case of wear or necessary alterations in the duct, this part can be quickly and easily removed and replaced.

According to an additional feature of the invention, suction openings can be provided in the air duct. When small amounts are being moved, these openings make possible the introduction of additional air and in this way limit the low pressure near the compartmentalized disk.

BRIEF DESCRIPTION OF THE DRAWINGS

Additional advantages and features of the arrangement specified by the invention are shown in the following description by means of the drawings. The drawings show one working model of the invention, specifically.

DESCRIPTION OF THE PREFERRED EMBODIMENT

Figure 1:
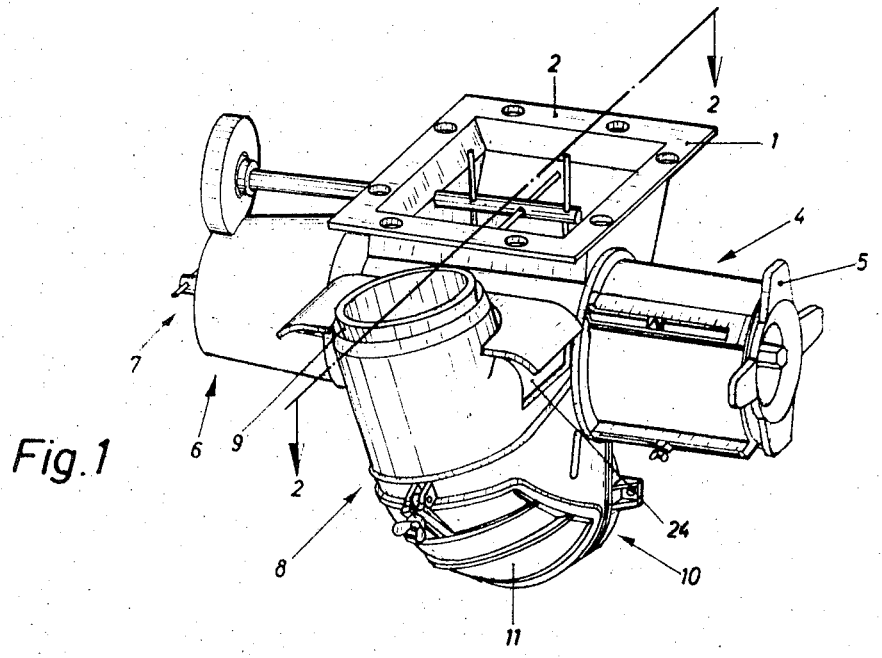
FIG. 1 is an illustrative view of the entire measuring device.
Figure 2:
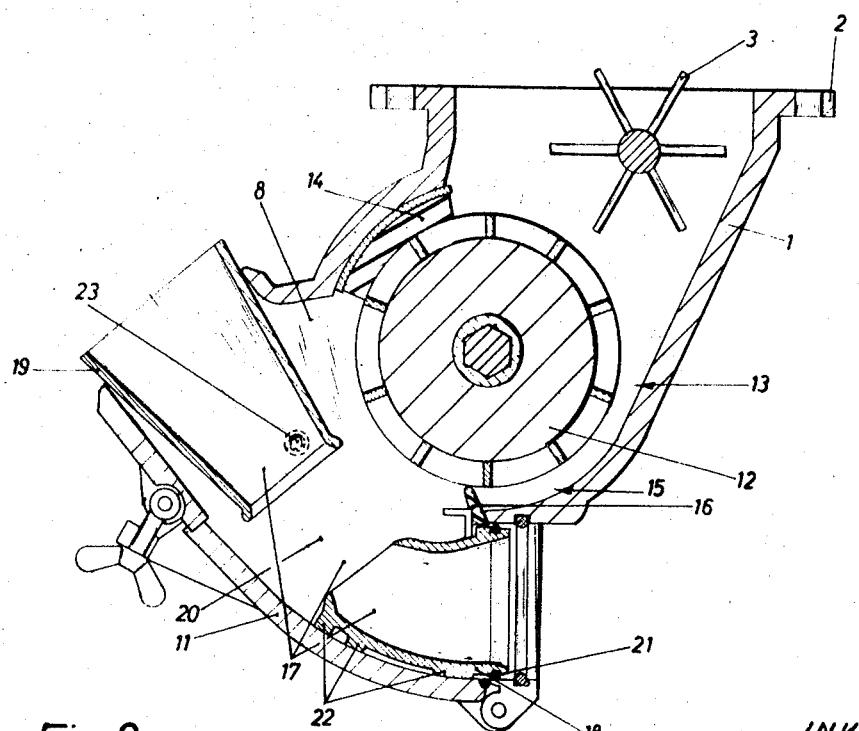
FIG. 2 is a cross-section following line 2—2 in FIG. 1.

In the figures, 1 designates the intake funnel which has a connecting flange 2, by means of which the entire device can be attached to the available supply bin. Inside the intake funnel there is a blending mechanism in the form of a pronged cylinder 3. This mechanism prevents the formation of clumps or arching masses in the intake funnel. Numeral 4 shows the usual scale for the amount adjustment which is set by means of a hand-wheel 5. The necessary drive elements are provided in a housing section 6. At 7, a so-called turn-off crank can be connected. An air duct 8 runs tangent to the unit constructed as explained above. At its discharge end 9, the air duct can be connected to a known pneumatically operating spreading system, while at 10, the connection tube leading from the air generator may be connected. The air duct 8 is provided with an evacuation damper 11, through which the seed material can be emptied and collected from the intake funnel and the compartmentalized dosage disk.

On the inside, specifically in the lower portion of intake funnel 1, there is located the actual compartmentalized dosage disk 12 which, after a familiar design, has diagonal teeth and admits of continuous adjustment for amount. Such compartmentalized dosage disks have become known in great numbers through the applicant so that further remarks concerning this known device are unnecessary. The compartmentalized dosage disk 12 is located inside outlet opening 13 of intake funnel 1 and is sealed on the reverse side by means of gasket 14 which extends along the circumference of the compartmentalized dosage disk over an area of sufficient length that an effective seal is achieved between intake funnel 1 and air duct 8. As specified by the invention, a lip seal 16 is located on the discharge side of compartmentalized dosage disk 12, such that this seal presses against the upper side of the compartment edges. In air duct 8, an ejector unit 17 is provided which consists of a trap-nozzle 18, an extension piece 19 and a feeder opening 20. The feeder opening 20 is formed in the following way: the front end of the trap-nozzle 18 which appears in the direction of flow is located at a certain distance from the mouthpiece of the extension piece 19. Because of the low pressure which develops in this area, the material expelled on the discharge side 15 of compartmentalized dosage disk 12 is easily carried along.

Both extension piece 19 and the actual trap-nozzle 18 are located inside air duct 8 in such a way as to be replaceable. For this purpose, the trap-nozzle 18 is installed by means of seals 21 in an appropriate space at the beginning of the air duct. The surface of the trap-nozzle is appropriately shaped, for example, by means of protruding cams 22, to fit the inside of the air duct. Extension piece 19 is installed in the air duct where it is held fast and is replaceable by means of screw-fixture 23.

The evacuation damper 11 is shaped and located in such a way as to provide the necessary access to ejector unit 17.

As is schematically shown with 24, air duct 8 can be provided with additional and, if necessary, adjustable and closeable suction openings. The movement of smaller amounts entails slower speeds. When this is the case, the vacuum is usually much greater than in the case of medium and larger amounts and/or speeds, and an effect opposite the prior art effect would be achieved. In addition to the measured amounts, other seed material would be sucked between the lip seal and the edges of the compartmentalized disk and there would no longer exist any linear relation between velocity and the amounts measured. In addition to preventing too high a vacuum to be drawn, these suction openings no longer permit high pressure to enter the tank.

The new model operates in a way which has already been explained above. Since this will be clear to experts, there is no need to go into it any further here.

It goes without saying that the invention is not restricted to the model represented. Rather, variations from this are possible which do not change the basic idea of the invention. In particular, variations of the compartmentalized dosage disk, the blending apparatus and the intake funnel are possible which would not involve the method of operation of the actual ejector unit and the sealing which are specified by the invention.

What is claimed is:

1. In a measuring device for a pneumatically operated system for spreading granular material such as seed material or fertilizer, an intake funnel adapted to be connected to a supply bin, a compartmentalized dosage disk rotatably mounted at the bottom of and within the outlet of the intake funnel, said disk having a discharge side, and the other side thereof being sealed by a gasket mounted on said intake funnel and operating on the circumference of the disk, and an air duct connected to the discharge side tangent to the compartmentalized dosage disk, by means of which the measured material discharged from the disk compartments is carried to the actual spreader, the improvement comprising the combination therewith of:
   a. an ejector unit located in said air duct adjacent the discharge side of said disk to form a low pressure area adjacent said discharge side, including a replaceable trap-nozzle for introducing an air flow therethrough, a replaceable extension piece located downstream and spaced from said trap-nozzle, and a feeder opening therebetween for said granulated material being discharged by said disk; and
   b. a simple, flexible lip seal mounted within the outlet of said intake funnel generally below said disk at said discharge side to press against and seal said compartmentalized dosage disk to prevent the measured material from being drawn out of the compartments by the low pressure in the area adjacent said discharge side until the compartment passes said lip seal.

* * * * *